United States Patent
Katsoulis et al.

(10) Patent No.: US 6,310,146 B1
(45) Date of Patent: Oct. 30, 2001

(54) SILSESQUIOXANE RESIN WITH HIGH STRENGTH AND FRACTURE TOUGHNESS AND METHOD FOR THE PREPARATION THEREOF

(75) Inventors: Dimitris Elias Katsoulis, Tokyo (JP); Zhongtao Li, Midland, MI (US); Frederick Jerome McGarry, Weston, MA (US); Bihn Thanh Nguyen; Bizhong Zhu, both of Midland, MI (US)

(73) Assignees: Dow Corning Corporation, Midland, MI (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/345,638

(22) Filed: Jul. 1, 1999

(51) Int. Cl.$^7$ ............................. C08L 83/05; C08L 83/07
(52) U.S. Cl. ..................... 525/477; 556/460; 556/479; 528/15; 528/32; 502/325
(58) Field of Search ..................... 556/460, 479; 528/15, 31, 32; 525/477; 502/325

(56) References Cited

U.S. PATENT DOCUMENTS

| | | |
|---|---|---|
| 3,419,593 | 12/1968 | Willing ........................ 260/448.2 |
| 3,445,420 | 5/1969 | Kookootsedes et al. ............ 260/37 |
| 4,803,244 * | 2/1989 | Umpleby . |
| 5,623,030 | 4/1997 | Tsumura et al. ..................... 525/478 |
| 5,747,608 | 5/1998 | Katsoulis et al. .................... 525/477 |
| 5,830,950 | 11/1998 | Katsoulis et al. .................... 525/477 |

FOREIGN PATENT DOCUMENTS

| | | |
|---|---|---|
| 691206 | 7/1964 | (CA) . |
| 0 661 332 A2 | 7/1995 | (EP) ............................. C08G/77/60 |

OTHER PUBLICATIONS

Tsumura M et al., "Silicon–Based Interpenetrating Polymer Networks (IPN's): Synthesis And Properties" Macromolecules, US, American Chemical Society. Easton, vol. 31, No. 9, May 5, 1998 pp. 2716–2723, XP000750328, ISSN: 0024–9297.

\* cited by examiner

Primary Examiner—Robert Dawson
Assistant Examiner—Kuo-Liang Peng
(74) Attorney, Agent, or Firm—Catherine U. Brown; Timothy J. Troy; Pamela M. Scaduto

(57) ABSTRACT

A cured silsesquioxane resin and method for its preparation are disclosed. By using a silyl-terminated hydrocarbon in the hydrosilylation reaction curable composition used to prepare the cured silsesquioxane resin, the cured silsesquioxane resin has improved strength and toughness without significant loss of modulus. A typical silyl-terminated hydrocarbon useful in this invention is silphenylene.

20 Claims, 1 Drawing Sheet

SILSESQUIOXANE RESIN WITH HIGH STRENGTH AND FRACTURE TOUGHNESS AND METHOD FOR THE PREPARATION THEREOF

FIELD OF THE INVENTION

This invention relates to cured silsesquioxane resins having high fracture toughness and strength without loss of modulus. This invention further relates to hydrosilylation reaction curable compositions used to prepare the cured silsesquioxane resins. This invention further relates to methods for preparing the cured silsesquioxane resins.

BACKGROUND OF THE INVENTION

Conventional thermoset networks of high cross link density, such as silsesquioxane resins, typically suffer from the drawback that when measures are taken to improve a mechanical property such as strength, fracture toughness, or modulus, one or more of the other properties suffers a detriment.

For example, increasing the toughness of various silicone compositions has been previously carried out by adding a silicone fluid to a silicone resin. U.S. Pat. No. 5,034,061 discloses a silicone resin/fluid polymer adapted to form a transparent, shatter-resistant coating. The composition includes a silicone resin copolymer consisting essentially of $R_3SiO_{1/2}$ and $SiO_{4/2}$ units with unsaturated olefinic functional R groups, a polydiorganosiloxane fluid with vinyl functionality, an organopolysiloxane crosslinker having hydrogen functionality and a catalyst. The composition is disclosed as being particularly adapted for use in coating incandescent glass lamps.

Canadian Patent 691,206 (1964) discloses the use of silica-filled silicone resin/fluid combinations for damping vibrations. The ability of the disclosed silicone resin/fluid compositions to dampen vibrations is illustrated through the measurement of the ratio of G', the elastic shear modulus, to G", the loss shear modulus. The magnitude of this ratio is indicated as being inversely proportional to the ability of the material to absorb vibration. The ratio of G'/G" of the subject materials is compared to that of compositions prepared without a resin constituent.

The above-described toughened silicone compositions are generally of the types having a fairly low modulus of elasticity. As used herein to describe silicone resins, the term "rigid" means that the resin material, in its unfilled condition, exhibits a certain "stiffness" characterized by having a Young's modulus of at least 0.69 GPa. As used herein, the term "unfilled" means that no reinforcing fillers, such as carbon or glass fibers or silica powders have been added to the resin.

Another method for increasing toughness of a silicone resin is by modifying the silicone resin with a rubber compound. U.S. Pat. No. 5,747,608 describes a rubber-modified resin and U.S. Pat. No. 5,830,950 describes a method of making the rubber-modified resin. The rubber modified-resin is prepared by reacting an uncured organosilicone resin and a silicone rubber. The resin and rubber can be reacted by addition reaction, condensation reaction, or free radical reaction. The resulting rubber-modified resin has a Young's modulus of at least 0.69 GPa in its unfilled condition. However, strength and toughness of the rubber-modified resin is generally inferior to tough organic polymers and still insufficient for some applications.

Rigid silsesquioxane resins have been employed in applications that take advantage of their heat- and fire-resistant properties. These properties make the silsesquioxane resins attractive for use in fiber-reinforced composites for electrical laminates, structural use in automotive components, aircraft and naval vessels. Thus, there exists a need for rigid silsesquioxane resins having increased flexural strength, flexural strain, fracture toughness $K_{Ic}$, and fracture energy $G_{Ic}$, without significant loss of modulus or degradation of thermal stability. In addition, rigid silsesquioxane resins have low dielectric constants and are useful as interlayer dielectric materials. Rigid silsesquioxane resins are also useful as abrasion resistant coatings. These applications require that the silsesquioxane resins exhibit high strength and toughness.

Therefore, it is an object of this invention to provide a curable composition that can be used to prepare a cured silsesquioxane resin having high strength and fracture toughness without loss of modulus. It is a further object of this invention to provide a method for preparing the cured silsesquioxane resin.

SUMMARY OF THE INVENTION

This invention relates to cured silsesquioxane resins and methods for their preparation. The cured silsesquioxane resins have improved strength and toughness over known resins. The improvements in strength and toughness were made without significant loss of stiffness. The cured silsesquioxane resins are prepared by hydrosilylation reaction of a silsesquioxane copolymer with a silyl-terminated hydrocarbon as a crosslinker. When this crosslinker is used instead of a traditional hydridosilane or hydridosiloxane crosslinker, the resulting cured silsesquioxane resin has unexpectedly high mechanical properties.

DETAILED DESCRIPTION OF THE INVENTION

Figure 1:
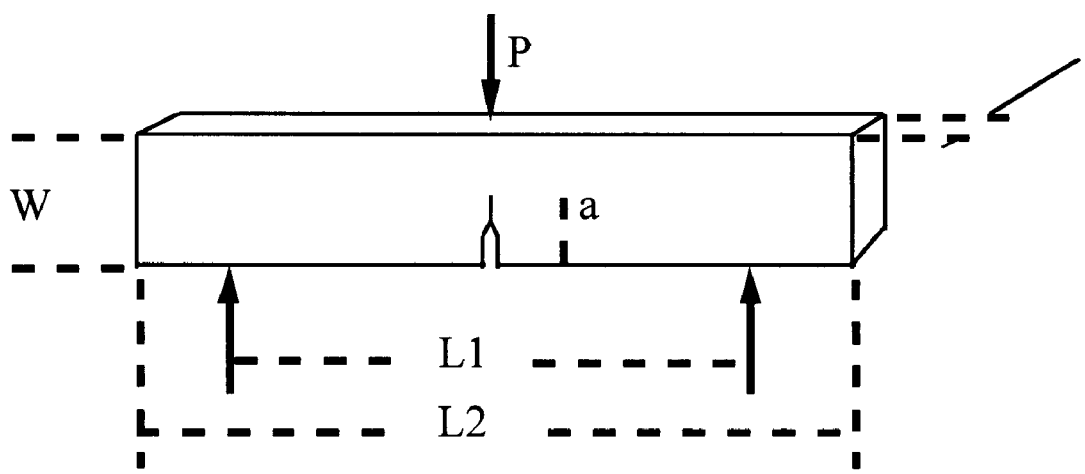
FIG. 1 represents a sample of the cured silsesquioxane resin used in fracture toughness testing.

This invention relates to a hydrosilylation reaction curable composition that is used to prepare a cured silsesquioxane resin. This curable composition comprises: (A) a silsesquioxane copolymer, (B) silyl-terminated hydrocarbon as a crosslinker, (C) a catalyst, (D) an optional catalyst inhibitor, (E) a first optional silicone rubber, (F) a second optional silicone rubber, and (G) an optional solvent.

Component (A) is a silsesquioxane copolymer comprising units that have the empirical formula $R^1_a R^2_b R^3_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is a functional group independently selected from the group consisting of hydrogen atoms and monovalent hydrocarbon groups having aliphatic unsaturation, and each $R^2$ and each $R^3$ are monovalent hydrocarbon groups independently selected from the group consisting of nonfunctional groups and $R^1$. Preferably, $R^1$ is an alkenyl group such as vinyl or allyl. Typically, $R^2$ and $R^3$ are nonfunctional groups selected from the group consisting of alkyl and aryl groups. Suitable alkyl groups include such as methyl, ethyl, isopropyl, n-butyl, and isobutyl. Suitable aryl groups are exemplified by phenyl. Suitable silsesquioxane copolymers for component (A) are exemplified by $(PhSiO_{3/2})_{75}$ $(ViMe_2SiO_{1/2})_{25}$, where Ph is a phenyl group, Vi represents a vinyl group, and Me represents a methyl group.

Component (B) is a silyl-terminated hydrocarbon having the general formula

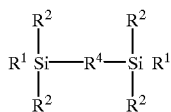

where $R^1$ and $R^2$ are as described above for component (A), with the provisos that when $R^1$ in component (A) is a hydrogen atom, $R^1$ in component (B) is an unsaturated monovalent hydrocarbon group and when $R^1$ in component (A) is an unsaturated monovalent hydrocarbon group, $R^1$ in component (B) is a hydrogen atom, and $R^4$ is a divalent hydrocarbon group. $R^4$ can have both arylene and alkylene segments.

Component (B) can be prepared by a Grignard reaction process. For example, one method for making a silyl-terminated hydrocarbon for use in this invention comprises heating to a temperature of room temperature to 200° C., preferably 50 to 65° C., a combination of magnesium and a solvent such as diethylether or tetrahydrofuran. A di-halogenated hydrocarbon, such as dibromobenzene is then added to the magnesium and solvent over a period of several hours.

After complete addition of the di-halogenated hydrocarbon, a halogenated silane, such as dimethylhydrogenchlorosilane, is then added, and an optional organic solvent can also be added. The resulting mixture is then heated for a period of several hours at a temperature of 50 to 65° C. Any excess halogenated silane is then removed by any convenient means, such as neutralization with a saturated aqueous solution of $NH_4Cl$. The resulting product can then be dried with a drying agent such as magnesium sulfate and then purified by distillation.

Component (B) is exemplified by compounds having the formulae:

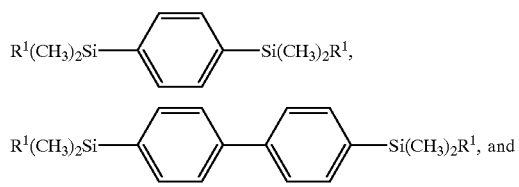

-continued

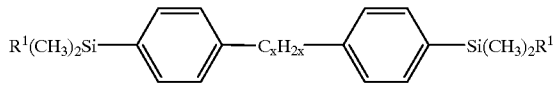

where $R^1$ is as defined above and x is an integer from 1 to 6, preferably 1 to 4. Compounds suitable for use as component (B) are known in the art and are commercially available. For example, p-bis(dimethylsilyl)benzene is available from Gelest, Inc. of Tullytown, Pa.

Components (A) and (B) are added to the composition in amounts such that the molar ratio of silicon bonded hydrogen atoms (SiH) to unsaturated groups (C=C) (SiH:C=C) ranges from 1.0:1.0 to 1.5:1.0. Preferably, the ratio is in the range of 1.1:1.0 to 1.5: 1.0. If the ratio is less than 1.0: 1.0, the properties of the cured silsesquioxane resin will be compromised because curing will be incomplete. The amounts of components (A) and (B) in the composition will depend on the number of C=C and Si—H groups per molecule. However, the amount of component (A) is typically 50 to 98 weight % of the composition, and the amount of component (B) is typically 2 to 50 weight % of the composition.

Component (C) is a hydrosilylation reaction catalyst. Typically, component (C) is a platinum catalyst added to the composition in an amount sufficient to provide 1 to 10 ppm of platinum based on the weight of the composition. Component (C) is exemplified by platinum catalysts such as chloroplatinic acid, alcohol solutions of chloroplatinic acid, dichlorobis(triphenylphosphine)platinum(II), platinum chloride, platinum oxide, complexes of platinum compounds with unsaturated organic compounds such as olefins, complexes of platinum compounds with organosiloxanes containing unsaturated hydrocarbon groups, such as Karstedtfs catalyst (i.e. a complex of chloroplatinic acid with 1,3-divinyl-1,1,3,3-tetramethyldisiloxane) and 1,3-diethenyl-1,1,3,3-tetramethyldisiloxane, and complexes of platinum compounds with organosiloxanes, wherein the complexes are embedded in organosiloxane resins. Suitable hydrosilylation reaction catalysts are described in U.S. Pat. No. 3,419,593 to Willing, Dec. 31, 1968, which is hereby incorporated by reference for the purpose of describing suitable catalysts.

Components (A), (B), and (C) comprise 10 to 100 weight % of the composition. The composition may further comprise one or more optional components.

Component (D) is an optional catalyst inhibitor, typically added when a one part composition is prepared. Suitable inhibitors are disclosed in U.S. Pat. No. 3,445,420 to Kookootsedes et al., May 20, 1969, which is hereby incorporated by reference for the purpose of describing catalyst inhibitors. Component (D) is preferably an acetylenic alcohol such as methylbutynol or ethynyl cyclohexanol. Component (D) is more preferably ethynyl cyclohexanol. Other examples of inhibitors include diethyl maleate, diethyl fumamate, bis (2-methoxy-1-methylethyl) maleate, 1-ethynyl-1-cyclohexanol, 3,5-dimethyl-1-hexyn-3-ol, 2-phenyl-3-butyn-2-ol, N, N, N', N'-tetramethylethylenediamine, ethylenediamine, diphenylphosphine, diphenylphosphite, trioctylphosphine, diethylphenylphosphonite, and methyldiphenylphosphinite.

Component (D) is present at 0 to 0.05 weight % of the hydrosilylation reaction curable composition. Component (D) typically represents 0.0001 to 0.05 weight % of the curable composition. Component (D) preferably represents 0.0005 to 0.01 weight percent of the total amount of the curable composition. Component (D) more preferably represents 0.001 to 0.004 weight percent of the total amount of the curable composition.

Component (E) is an optional silicone rubber. The amount of component (E) in the hydrosilylation reaction curable composition is 0 to 30 weight %, preferably 5 to 20 weight %. Suitable silicone rubbers for component (E) and methods for their incorporation into a curable composition are disclosed in U.S. Pat. Nos. 5,747,608 and 5,830,950, both of which are hereby incorporated by reference. The silicone rubber has the empirical formula:

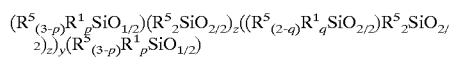
$(R^5{}_{(3-p)}R^1{}_p SiO_{1/2})(R^5{}_2 SiO_{2/2})_z((R^5{}_{(2-q)}R^1{}_q SiO_{2/2})R^5{}_2 SiO_{2/2})_y(R^5{}_{(3-p)}R^1{}_p SiO_{1/2})$ wherein each $R^1$ is as described above, p is 1, 2 or 3, q is 1 or 2, z is an integer greater than or equal to 6, and y is zero or an integer up to 10. Each $R^1$ is a functional group which does participate in the curing reaction to form the cured silsesquioxane of the present invention, as discussed above. Each $R^5$ group in component (E) is independently selected from the nonfunctional groups for $R^2$, described above.

In the empirical formula, z represents the average nonfunctional linear chain length of the silicone rubber, i.e. the average chain length between $R^1$ groups. Hence, component (E) can be a mixture of silicone rubbers of various degrees of polymerization, all of which are represented by above empirical formula. Most silicone rubbers used in connection with the present invention have $R^1$ groups only at the terminal groups of the chain. In such instances, the term "degree of polymerization" ("DP") as used herein is the same as the value of z. DP does not include the terminal functional siloxy groups.

In the preferred embodiment of the invention, the $R^5$ groups are methyl groups, phenyl groups, or a combination thereof. When a high percentage of the $R^2$ groups of component (A) the silsesquioxane copolymer and the $R^5$ groups of (E) the first silicone rubber are either predominantly methyl or predominantly phenyl, (A) the silsesquioxane copolymer and (E) the first silicone rubber are generally compatible, permitting the rubber to be dispersed throughout the cured silsesquioxane resin structure in a relatively homogeneous manner.

Component (F) the second optional silicone rubber is a polydiorganosiloxane of the empirical formula $R^5{}_2R^6SiO(R^5{}_2SiO)_m(R^5R^6SiO)_nSiR^6R^5{}_2$ wherein each $R^5$ is as described above, each $R^6$ is selected from the group consisting of $R^1$ and $R^5$, with the proviso that at least two $R^6$ groups per molecule must be $R^1$, m is 150 to 1,000, preferably 246 to 586, and n is 1 to 10. The amount of component (F) in the curable composition is generally 0 to 15 weight %, preferably 2–8 weight %.

The hydrosilylation reaction curable composition comprising components (A), (B), and (C), and any optional components can be dissolved in component (G), an optional solvent. Typically, the amount of solvent is 0 to 90 weight %, preferably 0 to 50 weight % of the curable composition. The solvent can be an alcohol such as methyl, ethyl, isopropyl, and t-butyl alcohol; a ketone such as acetone, methylethyl ketone, and methyl isobutyl ketone; an aromatic hydrocarbon such as benzene, toluene, and xylene; an aliphatic hydrocarbon such as heptane, hexane, and octane; a glycol ether such as propylene glycol methyl ether, dipropylene glycol, methyl ether, propylene glycol n-butyl ether, propylene glycol n-propyl ether, and ethylene glycol n-butyl ether; a halogenated hydrocarbon such as dichloromethane, 1,1,1-trichloroethane and methylene chloride; chloroform; dimethyl sulfoxide; dimethyl formarnide; acetonitrile and tetrahydrofuran. Toluene is preferred.

This invention further relates to a method for preparing the hydrosilylation reaction curable composition described above. The method comprises mixing the composition comprising components (A) to (G) described above. Mixing can be carried out by any suitable means. The curable composition can be made either as a one part or as multiple part composition, such as a two part composition.

When the curable composition is formulated as a one part composition, the method for preparing the one part composition generally comprises: (I) premixing (C) the catalyst and (D) the inhibitor, thereby forming a complex, and (II) mixing the complex with components (A), (B), and any desired optional components (E) to (G).

In an alternative embodiment of the invention, a one part composition can be prepared by (i) premixing (C) the catalyst and (D) the inhibitor, thereby forming a complex, (ii) mixing components (A), (B), (E), (F), and (G), (iii) removing (G) the solvent from the product of step (ii) thereby forming a fluid low viscosity composition, and thereafter (iv) mixing the complex with the product of step (iii).

A two part composition can be prepared by
(1) preparing a first part comprising component (A), and
(2) preparing a second part comprising component (B),
wherein component (C) is mixed with either the first or second part, and thereafter keeping the first and second parts separate. The first and second parts are mixed immediately before use.

Preferably, the two part composition is prepared by (1') mixing components (A), (E), (F) and (G) to form a first part, (2') mixing component (C) with a part selected from the group consisting of the first part and a second part comprising component (B). The first and second parts are thereafter kept separate until mixing immediately before use.

Each of the above methods may further comprise the step of degassing the composition before curing. Degassing is typically carried out by subjecting the composition to a mild vacuum.

This invention further relates to a method for preparing the cured silsesquioxane resin. This method comprises heating the hydrosilylation reaction curable composition described above at a temperature for a time sufficient to cure the hydrosilylation reaction curable composition described above. The curable composition may be degassed before curing, and any solvent may be removed before or during curing. The solvent may be removed by any convenient means such as by exposing the curable composition to mild heat or vacuum.

In an example of a hydrosilylation cure process, after the hydrosilylation reaction curable composition was degassed, it was then heated in an air circulating oven at 60° C. After half an hour in the oven the mixture gelled. After continuing to heat at 60° C. for an additional 24 hours to allow the residual solvent to escape, the temperature was then raised to 100° C. for 6 hours, 160° C. for 6 hours, 200° C. for 4 hours, and 260° C. for 8 hours. The oven was then turned off and the cast plate allowed to cool inside the oven. This curing cycle can be substantially shortened by removing the solvent more completely before cure.

The cured silsesquioxane resin prepared by curing the hydrosilylation reaction curable composition of this invention has superior mechanical properties over those of conventional silsesquioxane resins. Typically, the cured silsesquioxane resin has: flexural strain up to 14%, flexural strength up to 7,000 psi, flexural modulus up to 220 ksi, $K_{Ic}$ up to 1.08 MPam$^{1/2}$, and $G_{Ic}$ up to 788 N/m.

EXAMPLES

These examples are intended to illustrate the invention to those skilled in the art and should not be interpreted as limiting the scope of the invention set forth in the claims.

Reference Example 1

Preparation of p-bis(dimethylsilyl)benzene

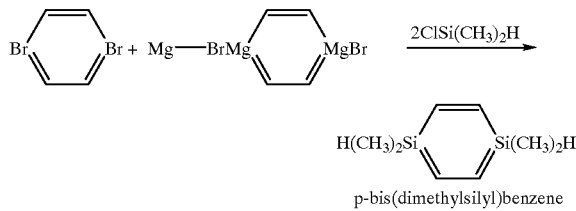

p-bis(dimethylsilyl)benzene

A 5 L three necked, round bottomed flask was charged with 84g of magnesium (Mg) and 406 g tetrahydrofuran (THF). The flask was equipped with a stirrer, a condenser, two addition funnels, a thermometer, and heated with a heating mantle and purged with dry nitrogen. 10 g of BrCH$_2$CH$_2$Br was added to activate the Mg. The solution of 270 g of dibromobenzene in 526g THF was added to one of the addition funnels, and 400 g of THF was added to the other addition funnel.

The flask was heated to 50 to 60° C., then 200 mL of THF was added and the dibromobenzene solution was added slowly. About 20 minutes later a strong exotherm was observed and heating was turned off. THF was added to control the exotherm. The addition of dibromobenzene was stopped to help control the exotherm.

When the exotherm was under control, the addition rate of dibromobenzene was adjusted so that a good amount of reflux was maintained. It took about one and a half hours to finish adding dibromobenzene.

After that 500 ml THF was added and the flask was heated at 65° C. for 5 hours, then the heater was turned off and the flask was cooled overnight under nitrogen while being stirred. When it was cooled down to room temperature, 500 mL more THF was added and 440 g of dimethyl chlorosilane was added slowly while the flask was cooled by a ice water bath. A dry ice condenser was mounted on top of the condenser to help minimize the loss of dimethyl chlorosilane. The addition of dimethyl chlorosilane was adjusted so that a good reflux was maintained. After the addition of dimethyl chlorosilane the flask was heated at 60° C. overnight.

The flask was cooled to room temperature and 1000 ml of toluene was added. Saturated NH$_4$Cl aqueous solution was added slowly to hydrolyze and condense the excess dimethyl chlorosilane and the mixture was then washed with a large amount of water until a more or less clear bottom phase was obtained.

The top organic phase was collected and dried with magnesium sulfate and most of the solvent was removed by distillation until a temperature of 150° C. in the flask was reached. The concentrated crude product was further purified by distillation under vacuum.

The distillation yielded 140 g of >96% pure p-bis (dimethylsilyl) benzene. Also obtained were 28 g of 80% pure, 25 g 41.5% pure and 15 g of 16% product in a mixed solvent of THF and toluene. The total yield was ~55%.

Formation of the product HMe$_2$SiC$_6$H$_4$SiMe$_2$H was confirmed by the observation of a major species of a molecular weight of 194 from GC-MS. FT-IR and NMR were used to further confirm the structure of the product. The infra-red spectrum of the product showed a strong SiH absorption at ~2125 cm$^{-1}$, methyl CH stretching at 2800 to 3000 cm$^{-1}$ methyl umbrella deformation at 1260 and 1415 cm$^{-1}$, and vibration of Si—Ph at ~1120 and 1440 cm$^{-1}$. Little siloxane was seen. The $^1$H NMR spectrum of the product showed three types of proton, and their ratio was 2:1:6, corresponding to hydrogen on the aromatic ring, SiH and CH$_3$. The splitting patterns of the methyl proton and the SiH proton were consistent with the expected structure. The $^{13}$C NMR showed three types of carbon, roughly in a ratio of 1:2:2, again consistent with the expected structure. The $^{29}$Si in CDCl$_3$ showed a single peak at 7.9 ppm.

Reference Example 2

Three Point Flexural Testing

The three point bending test was performed on an Instron 8562 per ASTM standard D 790. The cured resin specimens prepared in the Examples described below were polished until smooth, and visible scratch free surfaces were obtained. All samples were polished through the same procedure to ensure a similar surface condition. The polished samples were dried at 80° C. overnight and conditioned at the testing temperature and humidity for at least 24 hours before testing. The test temperature was 21° C. For each sample at least three specimens were tested.

During testing, force-displacement curves were recorded. The toughness of the cured resin was obtained as the area under the stress-strain curves. The flexural strength was calculated using the peak force as:

$$S=3PL/2bd^2$$

where S is the stress in the outer surface at the mid span, P the maximum load, L the support span, and b and d are the width and thickness of the beam. The maximum strain was calculated, using the maximum displacement, as:

$$\epsilon=6Dd/L^2$$

where ε is the strain at break and D is the maximum displacement. The slope of the steepest initial straight-line portion of the load-displacement curve was taken as the Young's modulus.

Reference Example 3

Fracture Toughness Testing

The plane strain fracture toughness, $K_{Ic}$, was obtained per ASTM D 5045, and the critical strain energy release rate, $G_{Ic}$, was calculated from $K_{Ic}$ based on Linear Elastic Fracture Mechanics (LEFM) assumptions. Six specimens of each sample were obtained. A notch was cut at the center of the specimen, and a natural crack extending from the root of the notch to about half of the width was produced by gently tapping a sharp razor blade into the notch. Samples were conditioned at room temperature for at least twenty four hours before testing to allow full relaxation of deformation. FIG. 1 represents a specimen used for fracture toughness testing. In FIG. 1, P represents the highest load, a represents pre-crack width, W represents a specimen width of 9.525 mm, L1 is 38 mm, and L2 is 51 mm. The displacement rate of the test was 10 mm/minute. For the geometry and loading conditions shown in FIG. 1, with a support to width ratio of 4, $$K_{Ic}=(P/(BW^{1/2}))f(x)$$

where P is the highest load and:

$$f(x)=6x^{1/2}(1.99-x(1-x)(2.15-3.93x+2.7x^2))/((1+2x)(1-x)^{3/2})$$

where x is the pre-crack to specimen width ratio, a/W. After the test the pre-crack length was measured. Only those specimens with a value between 0.45 to 0.55 were considered valid. The variation of x across the thickness should be less than 10%. The validity of the test was further ensured by comparing the sample dimensions with the estimated plastic zone size enlarged by approximately 50:

$$B,a,(W-a)>2.5(K_{Ic}/\sigma_y)^2$$

where a $\sigma_y$ is the yield stress of the sample.
From the $K_{Ic}$, $G_{Ic}$ was calculated by:

$$G_{Ic}=K^2_{Ic}(1-\nu^2)/E$$

where υ, the Poisson's ratio of the resin, was neglected to simplify the experiment. For a glassy polymer with a Poisson's ratio of 0.3, $G_{Ic}$ was exaggerated by about 9%. However, the relative ranking of $G_{Ic}$ values would not be obscured since the change of the square of the Poisson's ratio is usually small from one resin to another of similar stiffness.

Example 1

The p-bis(dimethylsilyl) benzene prepared in Reference Example 1 was reacted with a silsesquioxane copolymer having the formula $(PhSiO_{3/2})_{75}(ViMe_2SiO_{1/2})_{25}$, where Ph is a phenyl group, Vi represents a vinyl group, and Me represents a methyl group, by addition reaction. The resin copolymer was in a toluene solution with a solid content of 81.54 wt. % as determined in the lab by drying the resin solution at 130° C. for 4 hours and then 140° C. for 2 hours and monitoring the weight change. 67.5 grams of resin solution was mixed with 12.87 grams of the p-bis (dimethylsilyl) benzene so that the SiH:C=C ratio was 1.1:1.0, and 10 ppm of chloroplatinic acid was added. The concentration of Pt in the mixture was based on the total mass. The mixture was poured into an flat mold with one side open and degassed in a vacuum oven at 50° C. for fifteen minutes. The mold was then transferred to an air circulating oven at 60° C. After half an hour in the oven the mixture gelled and the temperature was kept at 60° C. for an additional 24 hours to allow the toluene to escape. Then the temperature was raised to 100° C. for 6 hours, 160° C. for 6 hours, 200° C. for 4 hours, and 260° C. for 8 hours. The oven was then turned off and the cast plate allowed to cool inside the oven.

The resulting cured silsesquioxane resin was evaluated by the test methods in Reference Examples 2–3. Young's Modulus, Strain at Break, Flexural Strength, $K_{Ic}$ and $G_{Ic}$ values are presented in Table 1.

Comparative Example 1

An addition reaction cured silsesquioxane resin was prepared by the method of Example 1, except that p-bis (dimethylsilyl) benzene was replaced with tetrakis (dimethylsiloxy) silane.

The resulting cured silsesquioxane resin was evaluated by the test methods in Reference Examples 4–5. Young's Modulus, Strain at Break, Flexural Strength, $K_{Ic}$ and $G_{Ic}$ values are presented in Table 1.

Comparative Example 2

An addition reaction cured silsesquioxane resin was prepared by the method of Example 1, except that p-bis (dimethylsilyl) benzene was replaced with phenyltris (dimethylsiloxy) silane.

The resulting cured silsesquioxane resin was evaluated by the test methods in Reference Examples 2–3. Young's Modulus, Strain at Break, Flexural Strength, $K_{Ic}$ and $G_{Ic}$ values are presented in Table 1.

TABLE 1

Test Results for Cured Silsesquioxane Resins

| Properties | Young's Modulus (ksi) | Strain at Break (%) | Flexural Strength (psi) | KIc (MPam$^{1/2}$) | GIc (J/m$^2$) |
|---|---|---|---|---|---|
| Example 1 | 216.5 | 12.14 | 6893.2 | 1.083 | 788.41 |
| Comparative Example 1 | 179.3 | 3.12 | 3925 | 0.286 | 66.8 |
| Comparative Example 2 | 156.4 | 3.39 | 3645 | 0.296 | 82.0 |

We claim:

1. A hydrosilylation reaction curable composition comprising:
   (A) a silsesquioxane copolymer comprising units that have the empirical formula $R^1_a R^2_b R^3_c SiO_{(4-a-b-c)/2}$, wherein a is zero or a positive number, b is zero or a positive number, c is zero or a positive number, with the provisos that $0.8 \leq (a+b+c) < 3.0$ and component (A) has an average of at least two $R^1$ groups per molecule, each $R^1$ is a functional group independently selected from the group consisting of hydrogen atoms and monovalent hydrocarbon groups having aliphatic unsaturation, each $R^2$ is a monovalent hydrocarbon group selected from nonfunctional groups and $R^1$, each $R^3$ is a monovalent hydrocarbon group selected from nonfunctional groups and $R^1$;

(B) a silyl-terminated hydrocarbon having the general formula

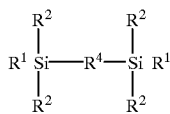

where $R^1$ and $R^2$ are as described above for component (A), with the provisos that when $R^1$ in component (A) is a hydrogen atom, $R^1$ in component (B) is an unsaturated monovalent hydrocarbon group and when $R^1$ in component (A) is an unsaturated monovalent hydrocarbon group, $R^1$ in component (B) is a hydrogen atom, and $R^4$ is a divalent hydrocarbon group; and (C) a hydrosilylation reaction catalyst.

2. The composition of claim 1, further comprising one or more components selected from the group consisting of:

(D) a hydrosilylation reaction catalyst inhibitor;

(E) a first silicone rubber having the empirical formula

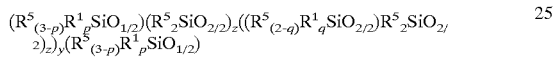

where each $R^1$ is as described above, each $R^5$ group in component (E) is independently selected from the nonfunctional groups for $R^2$, p is 1, 2 or 3, q is 1 or 2, z is an integer greater than or equal to 6, and y is zero or an integer up to 10;

(F) 0 to 15 weight % of a second silicone rubber having the empirical formula $R^5{}_2R^6SiO(R^{5hd\ 2}SiO)_m(R^5R^6SiO)_nSiR^6R^5{}_2$, where each $R^5$ is as described above, each $R^6$ is selected from the group consisting of $R^1$ and $R^5$, with the proviso that at least two $R^6$ groups per molecule must be $R^1$, m is 150 to 1,000, and n is 1 to 10; and (G) a solvent.

3. The curable composition of claim 1, wherein components (A) and (B) are added to the curable composition in amounts such that silicon bonded hydrogen atoms (SiH) and unsaturated hydrocarbon groups (C=C) in components (A) and (B) are present in the curable composition at a molar ratio (SiH:C=C) ranging from 1.0:1.0 to 1.5:1.0.

4. The curable composition of claim 3, wherein the molar ratio (SiH:C=C) ranges from 1.1:1.0 to 1.5:1.0.

5. The curable composition of claim 1, wherein component (B) is selected from the group consisting of compounds having the formulae:

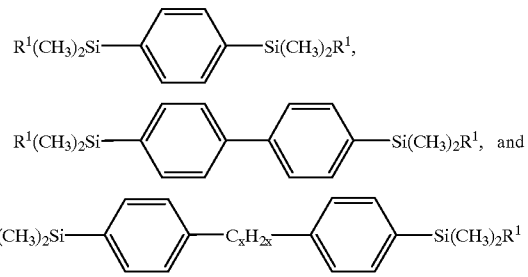

where $R^1$ is as defined above and x is an integer from 1 to 6.

6. The curable composition of claim 5, wherein component (B) is p-bis(dimethylsilyl) benzene.

7. The curable composition of claim 1, wherein component (C) is a platinum catalyst.

8. The curable composition of claim 7, wherein component (C) is added to the curable composition in an amount sufficient to provide 1 to 10 ppm of platinum by weight of the curable composition.

9. The curable composition of claim 1, wherein component (D) is added to the curable composition in an amount of 0.0001 to 0.05 weight %.

10. The curable composition of claim 1, wherein component (E) is added to the curable composition in an amount of 5 to 20 weight %.

11. The curable composition of claim 1, wherein component (F) is added to the curable composition in an amount of 2 to 8 weight %.

12. A method for preparing a hydrosilylation reaction curable composition comprising:

(I) mixing (A) a silsesquioxane copolymer comprising units that have the empirical formula $R^1{}_aR^2{}_bR^3{}_cSiO_{(4-a-b-c)/2}$, wherein a is zero or a positive number, c is zero or a positive number, with the provisos that 0.8 ≤(a+b+c)≤3.0 and component (A) has an average of at least 2 $R^1$ groups per molecule, and each $R^1$ is a functional group independently selected from the group consisting of hydrogen atoms and monovalent hydrocarbon groups having aliphatic unsaturation, and each $R^2$ is a monovalent hydrocarbon group independently selected from the group consisting of nonfunctional groups and $R^1$, and each $R^3$ is a monovalent hydrocarbon group independently selected from the group consisting of nonfunctional groups and $R^1$;

(B) a silyl-terminated hydrocarbon having the general formula

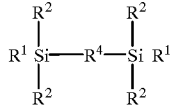

where $R^1$ and $R^2$ are as described above for component (A), with the provisos that when $R^1$ in component (A) is a hydrogen atom, $R^1$ in component (B) is an unsaturated monovalent hydrocarbon group and when $R^1$ in component (A) is an unsaturated monovalent hydrocarbon group, $R^1$ in component (B) is a hydrogen atom, and $R^4$ is a divalent hydrocarbon group; and (C) a hydrosilylation reaction catalyst.

13. The method of claim 12, wherein the composition further comprises one or more optional components selected from the group consisting of:

(D) of a hydrosilylation reaction catalyst inhibitor;

(E) a first silicone rubber having the empirical formula

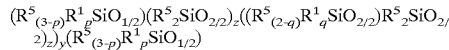

where each $R^1$ is as described above, each $R^5$ group in component (E) is independently selected from the nonfunctional groups for $R^2$, p is 1, 2 or 3, q is 1 or 2, z is an integer greater than or equal to 6, and y is zero or an integer up to 10;

(F) a second silicone rubber having the empirical formula $R^5{}_2R^6SiO(R^{5hd\ 2}SiO)_m(R^5R^6SiO)_nSiR^6R^5{}_2$ where each $R^5$ is as described above, each $R^6$ is selected from the group consisting of $R^1$ and $R^5$, with the proviso that at least two $R^6$ groups per molecule must be $R^1$, m is 150 to 1,000, and n is 1 to 10; and (G) of a solvent.

14. The method of claim 13, wherein the method further comprises (II) heating the product of step (I) at a temperature and for a time sufficient to cure, thereby forming a cured silsesquioxane resin.

15. The method of claim 14, wherein the method further comprises degassing the product of step (I) before step (II).

16. The method of claim 15, wherein the hydrosilylation reaction curable composition is a one part hydrosilylation reaction curable composition, components (C) and (D) are premixed, thereby forming a complex, and thereafter the complex is mixed in the composition of step (I).

17. The method of claim 16, wherein the composition of step (I) comprises component (G), and component (G) is removed from the composition before mixing the complex in the composition of step (I).

18. The method of claim 13, wherein the hydrosilylation reaction curable composition is a two part hydrosilylation reaction curable composition, and the 2 part composition is prepared by a method comprising (1) preparing a first part comprising component (A), and (2) preparing a second part comprising component (B), wherein component (C) is mixed with a part selected the first part and the second part, prior to step (I).

19. The method of claim 18, wherein the first part is prepared by mixing components (A), (E), (F), and (G), and component (C) is mixed with a part selected from the group consisting of the first part and a second part comprising component (B).

20. A cured silsesquioxane resin prepared by the method of claim 14.

* * * * *